United States Patent
Shogaki

(10) Patent No.: US 9,075,513 B2
(45) Date of Patent: Jul. 7, 2015

(54) INFORMATION PROCESSING APPARATUS, CONTROL METHOD OF INFORMATION PROCESSING APPARATUS, AND PROGRAM

(75) Inventor: Yohei Shogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 13/508,496

(22) PCT Filed: Mar. 21, 2012

(86) PCT No.: PCT/JP2012/058040
§ 371 (c)(1),
(2), (4) Date: May 7, 2012

(87) PCT Pub. No.: WO2012/128393
PCT Pub. Date: Sep. 27, 2012

(65) Prior Publication Data
US 2012/0262368 A1    Oct. 18, 2012

(30) Foreign Application Priority Data
Mar. 24, 2011    (JP) ................................ 2011-065298

(51) Int. Cl.
| | |
|---|---|
| G06F 3/01 | (2006.01) |
| G09G 5/00 | (2006.01) |
| G06F 3/0484 | (2013.01) |
| G06F 3/041 | (2006.01) |
| G06F 3/0488 | (2013.01) |

(52) U.S. Cl.
CPC .......... *G06F 3/04842* (2013.01); *G06F 3/0416* (2013.01); *G06F 3/0488* (2013.01)

(58) Field of Classification Search
USPC .................... 345/156, 173; 715/700
See application file for complete search history.

(56) References Cited

U.S. PATENT DOCUMENTS

| | | | | |
|---|---|---|---|---|
| 5,635,958 | A * | 6/1997 | Murai et al. | 345/168 |
| 7,391,413 | B2 * | 6/2008 | Ono et al. | 345/173 |
| 8,334,837 | B2 * | 12/2012 | Radivojevic et al. | 345/156 |
| 2005/0057512 | A1 * | 3/2005 | Du et al. | 345/168 |
| 2005/0162402 | A1 * | 7/2005 | Watanachote | 345/173 |
| 2005/0168449 | A1 * | 8/2005 | Katayose | 345/173 |
| 2007/0137901 | A1 * | 6/2007 | Chen | 178/18.01 |
| 2008/0007532 | A1 * | 1/2008 | Chen | 345/173 |
| 2008/0096610 | A1 * | 4/2008 | Shin et al. | 455/566 |

(Continued)

FOREIGN PATENT DOCUMENTS

| | | |
|---|---|---|
| JP | H04-051309 A | 2/1992 |
| JP | 2004-355648 A | 12/2004 |

(Continued)

*Primary Examiner* — Grant Sitta
(74) *Attorney, Agent, or Firm* — Fitzpatrick, Cella, Harper & Scinto

(57) ABSTRACT

It enables a user to easily confirm whether or not a process corresponding to a key was correctly performed. To do so, there is provided a control method for controlling an information processing apparatus, comprising: controlling, in a case where, after a key in a screen displayed on a display unit was depressed, the key comes to be not depressed inside a display area of the key, to perform a process corresponding to the key, and, in a case where, after the key in the screen displayed on the display unit was depressed, the key comes to be not depressed outside the display area of the key, to not perform the process corresponding to the key; and notifying, in the case where the key comes to be not depressed outside the display area of the key, the user that the process corresponding to the key is not performed.

8 Claims, 2 Drawing Sheets

(56) References Cited

U.S. PATENT DOCUMENTS

| | | | |
|---|---|---|---|
| 2008/0158144 A1* | 7/2008 | Schobben et al. | 345/156 |
| 2009/0219254 A1* | 9/2009 | Lai et al. | 345/173 |
| 2011/0169744 A1* | 7/2011 | Ko et al. | 345/170 |
| 2011/0211222 A1 | 9/2011 | Shogaki | |

FOREIGN PATENT DOCUMENTS

| | | |
|---|---|---|
| JP | 2005-208992 A | 8/2005 |
| JP | 2008-146201 A | 6/2008 |

\* cited by examiner

INFORMATION PROCESSING APPARATUS, CONTROL METHOD OF INFORMATION PROCESSING APPARATUS, AND PROGRAM

This application is a National Stage application under 35 U.S.C. §371 of International Application No. PCT/JP2012/058040, filed on Mar. 21, 2012, which claims priority to Japanese Application No. 2011-065298, filed on Mar. 24, 2011, the contents of each of the foregoing applications being incorporated by reference herein.

TECHNICAL FIELD

The present invention relates to an information processing apparatus, a control method of the information processing apparatus, and a program for achieving the control method.

BACKGROUND ART

Among conventional information processing apparatuses, there are information processing apparatuses each of which displays a display screen including keys (or buttons) thereon, and performs a process defined to the key on the basis of not a position at which the key was depressed but a position at which the depressed key was released from the display screen (e.g., PTL 1).

When a user once depresses the key on the screen displayed on the display screen and then erroneously releases his/her finger from the key at a position deviated from a key area, the process defined to the relevant key is not performed. Here, the key area is the area in which the key has been provided. Then, when it is detected that the key comes to be not depressed inside the key area, the process defined to this key is performed.

Incidentally, when the screen is enormously changed as in a case where the overall display screen is changed over in response to depression of the key, it is possible for the user to confirm whether or not the process defined to the relevant key has been performed. However, for example, when the screen is not enormously changed as in a case where only a character is input, it is hard for the user to confirm whether or not the process corresponding to the key of the input character has been correctly performed.

CITATION LIST

Patent Literature

PTL 1: Japanese Patent Application Laid-Open No. 2008-146201

SUMMARY OF INVENTION

The present invention has been completed in order to solve such a problem as described above, and an object of the present invention is to provide an information processing apparatus which comprises: a control unit configured to control, in a case where, after a key in a screen displayed on a display unit was depressed, the key comes to be not depressed inside a display area of the key, to perform a process corresponding to the key, and, in a case where, after the key in the screen displayed on the display unit was depressed, the key comes to be not depressed outside the display area of the key, to not perform the process corresponding to the key; and a notification unit configured to notify, in the case where the key comes to be not depressed outside the display area of the key, a user that the process corresponding to the key is not performed.

Advantageous Effect of Invention

According to the present invention, it is possible to easily confirm whether or not the process corresponding to the key has been performed correctly.

Further features of the present invention will become apparent from the following description of exemplary embodiments with reference to the attached drawings.

DESCRIPTION OF EMBODIMENTS

Hereinafter, exemplary embodiments of the present invention will be described in detail with reference to the attached drawings. Incidentally, it should be noted that the following embodiments do not limit the present invention as recited in the appended claims, and that all of combinations of features described in the embodiments are not necessarily indispensable as solutions in the present invention.

Description of System Constitution

First Embodiment

Figure 1:
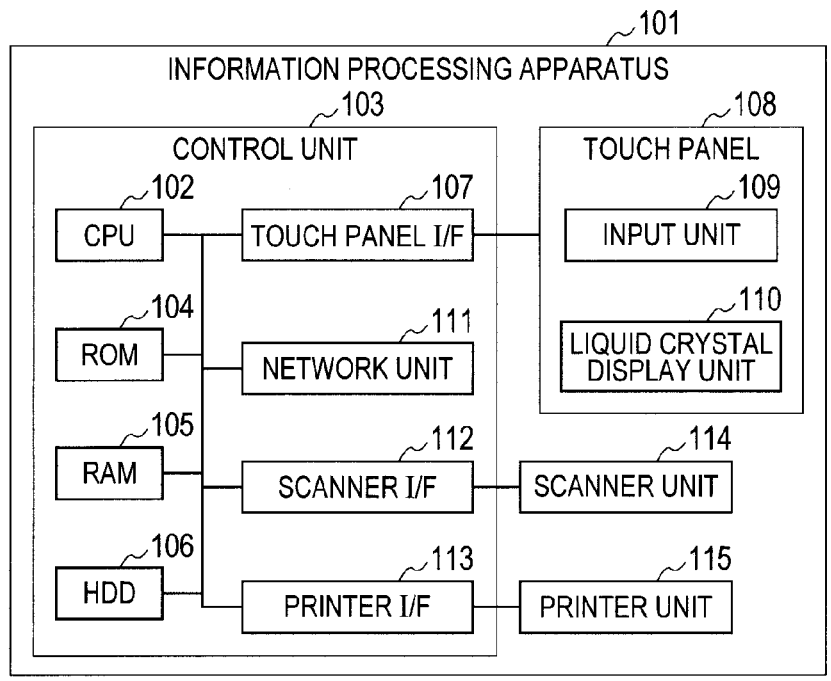
FIG. 1 is a block diagram illustrating an entire constitution of an information processing apparatus according to the present invention.

FIG. 1 is a block diagram illustrating a constitution of an MFP (Multi-Function Peripheral) which is an example of an information processing apparatus according to the present invention.

In the drawing, an information processing apparatus 101 is equipped with a control unit 103, a touch panel 108, a scanner unit 114 and a printer unit 115.

Further, the control unit 103 is equipped with a CPU (central processing unit) 102, a ROM (read only memory) 104, a RAM (random access memory) 105, an HDD (hard disk drive) 106, a touch panel I/F (interface) 107, a network unit 111, a scanner I/F 112, and a printer I/F 113.

The CPU 102 controls an overall operation of the information processing apparatus 101. For example, the CPU 102 reads out a control program stored in the ROM 104, and performs various controls such as a reading control, a screen display control and the like by reading the control program stored in the ROM 104. The RAM 105 is used as a temporary storage area such as a main memory, a working area or the like of the CPU 102.

The HDD 106 stores therein image data, various programs, various settings, screen display data and the like.

The touch panel I/F 107 is used to connect the touch panel 108 and the control unit 103 to each other, and thus control transmission and reception of various data between the touch panel 108 and the control unit 103.

The network unit 111 controls transmission and reception of various data between the information processing apparatus and an external apparatus such as a PC (personal computer), another MFP, or the like through a network.

The scanner I/F 112 controls transmission and reception of various data between the scanner unit 114 and the control unit 103. The printer I/F 113 controls transmission and reception of various data between the printer unit 115 and the control unit 103.

The scanner I/F 114 reads an original document in response to an instruction sent from the CPU 102, and generates image data indicating an image of the read original document. Then, the generated image data is stored in the HDD 106 through the scanner I/F 112.

The printer unit 115 performs print in response to an instruction sent from the CPU 102. More specifically, when the printer unit 115 receives the print instruction and the image data from the CPU 102 through the printer I/F 113, then the printer unit 115 feeds a print paper from a paper feeding cassette, prints an image on the basis of the received image data on the fed print paper, and discharges the print paper on which the image has been printed to a paper discharge tray.

The touch panel 108 is equipped with an input unit 109 and a liquid crystal display unit 110. More specifically, the input unit 109, which is constituted by a touch panel sheet and a plurality of hardware keys, accepts an instruction input from a user. Besides, the liquid crystal display unit 110 displays various kinds of screens such as an initial screen, a password input screen and the like.

The touch panel sheet, which has been adhered onto the liquid crystal display unit 110, transfers information indicating a position depressed by the user to the CPU 102. Here, the CPU 102 causes the liquid crystal display unit 110 to display a screen including a plurality of buttons (also called keys) thereon, and performs a process corresponding to the button which is present at the position depressed by the user through the touch panel sheet.

The information processing apparatus 101, which has the constitution as described above, has a copy function, a data transmission function, a box function and the like, and performs various kinds of jobs by utilizing these functions. Further, the information processing apparatus 101 performs a copy job of printing, by the printer unit 115, the image of the original document read by the scanner unit 114. Furthermore, the information processing apparatus 101 performs a box storing job of storing, in the HDD 106, the image data indicating the image of the original document read by the scanner unit 114. In addition, the information processing apparatus 101 performs a data transmission job of transmitting the image data indicating the image of the original document read by the scanner unit 114 and the image data stored in the HDD 106 to an external apparatus through the network unit 111. Moreover, the information processing apparatus 101 performs a print job of storing the image data received from an external apparatus through the network unit 111 in the HDD 106, and performing print by the printer unit 115 in accordance with the image data stored in the HDD 106 or image data to which a password has been added. Here, the image data to which the password has been added is stored in the HDD 106. Then, when a correct password which equivalent to the password added to the image data is input by the user through the input unit 109, the stored image data to which the relevant password has been added is printed by the printer unit 115. Incidentally, in the present embodiment, the MFP is used as the information processing apparatus 101. However, the present invention is not limited to this. Namely, an SFP (Single-Function Peripheral), a PC, a mobile phone or the like may be used as the information processing apparatus 101.

Figure 2A:
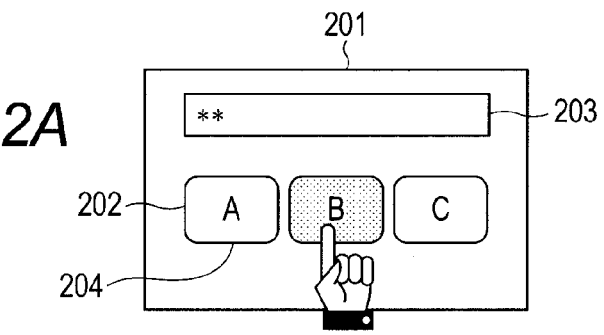
FIGS. 2A and 2B are diagrams for describing an example of a UI (user interface) to be displayed on a liquid crystal display unit.
Figure 2B:
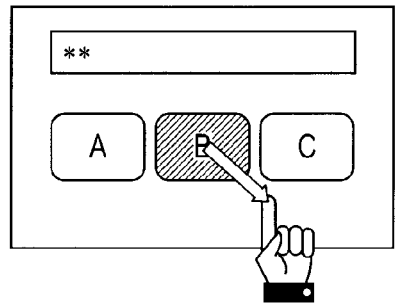

FIGS. 2A and 2B are diagrams for describing an example of the screen to be displayed on the liquid crystal display unit 110 illustrated in FIG. 1. Here, it should be noted that this screen is displayed under the control of the CPU 102. Incidentally, when the liquid crystal display unit 110 is uniquely equipped with a control unit, the control unit may control the display of such a user interface in response to an instruction sent from the CPU 102.

Incidentally, it should be noted that the user interface illustrated in FIGS. 2A and 2B is a password input screen for causing the user to input a password. When the user logs in to the information processing apparatus, the password input screen is displayed for causing the user to input the password necessary for the login. Incidentally, when the image data stored in the information processing apparatus is encrypted by using a password and then the encrypted image data is transmitted, the password input screen may be displayed for inputting the password to be used for the encryption of the stored image data. Moreover, the password input screen may be displayed when the image data with the password added stored in the HDD 106 is printed by the printer unit 115.

Incidentally, in the present embodiment, to simplify the description, an example that three buttons (keys) of "A" to "C" are arranged on a password input screen 201 will be described. However, the present invention is not limited to this example. Namely, alphabet keys of "A" to "Z" or numerical keys of "0" to "9" may be arranged on the password input screen. Moreover, an "OK" key which is used to decide input contents, and a "Cancel" key which is used to cancel inputs may be arranged on the password input screen.

Here, FIG. 2A illustrates a state that the button provided on the password input screen 201 is being depressed by the finger of the user.

In FIG. 2A, a plurality of character input buttons 202 and a character display section 203 are displayed on the password input screen 201. Moreover, a button area 204 is equivalent to a display area which is within the screen area and on which the character input button 202 is displayed.

When the character input button 202 is displayed in blue in a state that this button is not yet depressed by the user (i.e., a non-depression state). Then, after the character input button 202 was depressed, when the depression state is released in the display area of the character input button 202, the character displayed on the character input button 202 is input by the CPU 102. In other words, the character corresponding to the depressed character input button 202 is stored in the RAM 105 under the control of the CPU 102. Then, instead of the input character included in an input character string, an asterisk ("*") symbol is displayed in the character display section 203 by the CPU 102. In the screen illustrated in FIG. 2A, the two characters are stored in the RAM 105, and the two asterisk ("*") symbols are displayed in the character display section 203. Incidentally, after the character input button 202 was depressed, when the depression state is released outside the display area of the character input button 202, the character displayed on the character input button 202 is not input by the CPU 102. In other words, the character corresponding to the depressed character input button 202 is not stored in the RAM 105 under the control of the CPU 102.

The user inputs the password by using the password input screen like this.

Subsequently, control of the screen and control of a sound to be performed under the control of the CPU 102 when the character input button 202 is handled and operated will be described.

When a coordinate position (i.e., a depression start position) which has been depressed by the user on the touch panel is within the button area 204 of the character input button 202 displayed on the screen, a sound indicating that the button has been depressed is generated under the control of the CPU 102. Further, under the control of the CPU 102, the character input button 202 of the button area 204 to which the depressed coordinate position belongs is set to have a shape being depressed (for example, a shape indicating that the button has been dented), and the color of the character input button 202 is changed from blue to yellow. As a result, by the above sound and display, it is possible for the user to confirm whether or not the relevant button was correctly depressed.

Subsequently, when the position at which the depression state made by the figure of the user was released is being inside the button area 204 of the button displayed on the screen, the character displayed on the character input button 202 is input as the process defined to the character input button 202 concerning the relevant button area 204. At that time, a change display is performed by the CPU 102 to return the display of the button to the display to be performed prior to the depression (designation) of the button. That is, under the control of the CPU 102, the character input button is set to have a shape being not depressed (for example, a shape indicating that the button is not dented), and the color of the character input button is returned to blue. Subsequently, under the control of the CPU 102, the input character is stored in the RAM 105, and the asterisk ("*") symbol, instead of the relevant character, is displayed in the character display section 203.

On the other hand, as illustrated in FIG. 2B, it is assumed that, after the button on the password input screen 201 was depressed by the finger of the user, this finger of the user is moved outside the button area 204 while the touch panel is being depressed by this finger of the user. Then, when the position at which the depression state by the finger of the user is released is outside the button area 204 of the button displayed on the screen, the process defined to the button concerning the relevant button area 204 is not performed by the CPU 102.

For example, even if the user believes that he/she has input the character "B", when the position at which the user released his/her finger from the touch panel is outside the button area 204, the character "B" is not actually input. In other words, the character "B" is not stored in the RAM 105 under the control of the CPU 102. At this time, since the character which has been already input is displayed as the asterisk "*" symbol, it is difficult for the user to confirm whether or not the character "B" has been input. Under normal circumstances, when the first and second characters are displayed respectively by the asterisk "*" symbols and then the button corresponding to the character "B" is depressed by the user, the third asterisk "*" symbol must be displayed in the character display section 203. However, in the example illustrated in FIG. 2B, the third asterisk "*" symbol is not displayed. When the user confirms the character display section 203 to count the number of the asterisk "*" symbols every time he/she depresses the key, he/she may confirm whether or not the character corresponding to the depressed key has been input. Such an operation puts a burden on the user. In particular, when the number of the asterisk "*" symbols is increased, it becomes difficult for the user to always understand the number of the asterisk "*" symbols and decrease or increase in the number of the asterisk "*" symbols.

Consequently, the information processing apparatus 101 according to the present embodiment provides the mechanism by which it is possible for the user to easily confirm whether or not the character corresponding to the character input button 202 depressed by the user has been input. More specifically, when the coordinate position at which the finger of the user is released from the touch panel is present outside the button area 204 of the button displayed on the screen, the CPU 102 of the information processing apparatus 101 according to the present embodiment sets the character input button to have the shape being not depressed, and changes the color of the character input button from yellow to red (not blue), thereby notifying the user that the character "B" has not been input.

By doing so, it is possible for the user to easily recognize whether or not the character corresponding to the depressed character input button 202 has been input.

Figure 3:
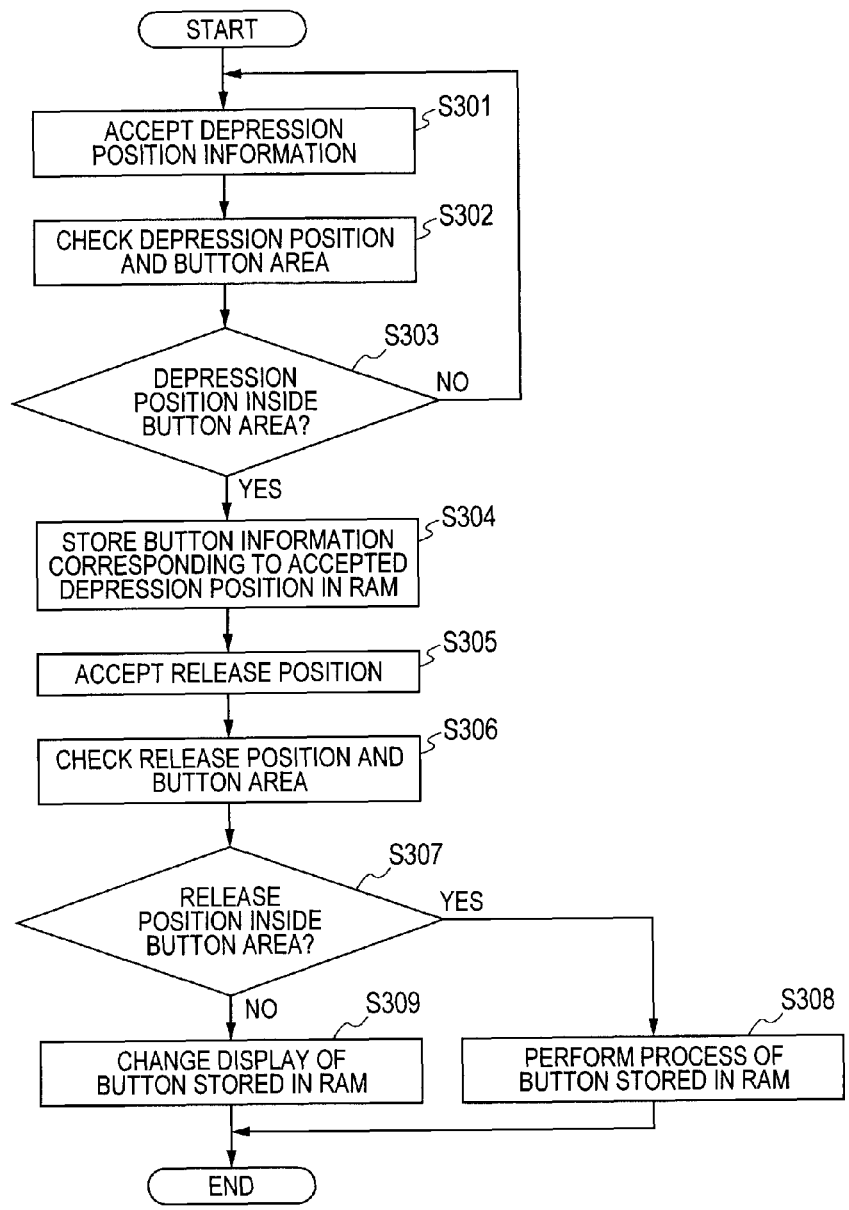
FIG. 3 is a flow chart for describing a control method of the information processing apparatus according to the present invention.

FIG. 3 is a flow chart for describing a control method of the information processing apparatus according to the present embodiment. Here, it should be noted that the relevant flow chart indicates an example of a procedure of a display process to be performed by the information processing apparatus 101. Incidentally, it should be noted that the process indicated by the flow chart of FIG. 3 is performed when the CPU 102 reads and performs the program stored in the ROM 104.

In a step S301, when the touch panel sheet of the input unit 109 is depressed by the user, depression position information notified from the input unit 109 of the touch panel 108 is accepted by the CPU 102. Here, it should be noted that the depression position information indicates the coordinates of the position on the touch panel 108 depressed by the user.

In a step S302, the accepted depression position information and the button area 204 set on the screen displayed on the liquid crystal display unit of the touch panel are checked by the CPU 102 on the basis of the screen display data stored in the HDD 106. Here, it should be noted that the screen display data includes an identifier of each of the buttons arranged on the screen to be displayed, information indicating the coordinates of the position at which each of the buttons is being arranged, and information indicating the function corresponding to each of the buttons.

Next, in a step S303, it is discriminated by the CPU 102 whether or not the position depressed by the user with his/her finger is inside the button area 204. When it is discriminated by the CPU 102 that the position depressed by user with his/her finger is inside the button area 204, the procedure is advanced to a step S304.

On the other hand, when it is discriminated by the CPU 102 that the position of the screen on the touch panel 108 depressed by the user with his/her finger is not inside the button area 204, the procedure is returned to the step S301, and it is then waited until the touch panel sheet of the input unit 109 is again depressed by the user.

Next, in the step S304, the button information (the identifier of the button, the information indicating the coordinates of the position of the button, the information indicating the function of the button, and the like) corresponding to the button area 204 discriminated in the step S303 is stored in the RAM 105 under the control of the CPU 102. Moreover, in the step S304, the color of the button area 204 originally displayed with blue on the touch panel 108 is changed to yellow by the CPU 102. By doing so, it is possible for the user to confirm that the button corresponding to the button area 204 is in the depression state.

Subsequently, in a step S305, release position information notified from the input unit 109 of the touch panel 108 is accepted by the CPU 102. Here, it should be noted that the release position information is the information indicating the position at which the finger of the user depressing the touch panel 108 is released from the touch panel 108. In other words, the release position information is the information indicating the position at which the state that the touch panel sheet is being depressed is released.

Next, in a step S306, the accepted release position information and the button area 204 set on the screen displayed on the liquid crystal display unit 110 of the touch panel are checked by the CPU 102 on the basis of the screen display data stored in the HDD 106. Subsequently, in a step S307, it is discriminated by the CPU 102 whether or not the release position of the present embodiment at which the finger of the user is released from the display screen is inside the button area 204.

Here, when it is discriminated by the CPU 102 that the release position is inside the button area 204, the procedure is advanced to a step S308. On the other hand, when it is discriminated by the CPU 102 that the release position is not inside the button area 204, the procedure is advanced to a step S309.

Then, in the step S308, the process defined to the button concerning the button information stored in the RAM 105 is performed by the CPU 102. For example, if it is assumed that the depressed button is the button for inputting the character "B", the character "B" is input under the control of the CPU 102. Moreover, in the step S308, the displayed color of the button is changed from yellow to blue by the CPU 102.

On the other hand, when the procedure is advanced to the step S309, the button concerning the button information stored in the RAM 105 is displayed with a display form different from that in the case where the button is displayed when it was discriminated in the step S307 that the release position at which the finger of the user was released from the display screen was inside the button area 204, under the control of the CPU 102. For example, the displayed color of the relevant button is changed from yellow to red by the CPU 102.

By performing such control as described above, it is possible for the user to easily confirm whether or not the process (inputting of the character, or the like) corresponding to the button corresponding to the button area 204 has been performed correctly. Incidentally, the displayed color of the button which has been changed to red is returned from red to blue by the CPU 102 on condition that a predetermined time has elapsed from the time when the displayed color of the relevant button was changed from blue to red.

In the present embodiment, when the finger of the user is released outside the button area 204, the fact that the character corresponding to the target button has not been input is notified to the user by changing the color of the relevant button to red. However, the method of notifying the user that the character corresponding to the button has not been input is not limited to the above method. Namely, it may be possible to change the displayed color of the button to a color other than red. Further, it may be possible to change the shape of the button to a circular shape, or to blink the button. Furthermore, it may be possible to display the button on the screen while swinging it. Moreover, the method of notifying the user that the character corresponding to the button has not been input is not limited to the method of changing the display form of the button. Namely, it may be possible to blink the screen as a whole. Further, it may be possible to change the color of the screen as a whole. Moreover, the method of notifying the user that the character corresponding to the button has not been input is not limited to the above methods of changing the display form of the screen. Namely, it may be possible by the CPU 102 to generate an alarm sound indicating that the character corresponding to the button has not been input. Further, it may be possible by the CPU 102 to output an alarm message such as "a character has not been input". Furthermore, it may be possible by the CPU 102 to vibrate the information processing apparatus 101 by using a not-illustrated vibration unit. Furthermore, it may be possible to perform the above operations simultaneously or perform the above plurality of operations in succession.

Besides, in the present embodiment, the displayed color of the button once changed to red is returned to blue by the CPU 102 on condition that the predetermined time has elapsed from the time when the displayed color of the relevant button was changed to red. However, the condition of returning the displayed color of the button to the original color is not limited to this. For example, it may be possible to rerun the displayed color of the button to blue according to a fact that another button is depressed. Further, in the present embodiment, when the process corresponding to the button has been performed correctly, the displayed color of the button is returned from yellow to blue. However, it may be possible to, before returning the displayed color of the button to blue, change the color to green for a predetermined time and then return it to blue. By doing so, it is possible for the user to more clearly recognize that the process corresponding to the button has been performed correctly.

Furthermore, in the present embodiment, the buttons arranged on the password input screen are handled. However, it should be noted that the screen to be displayed by the information processing apparatus 101 includes not only the password input screen but also a transmission destination setting screen to be used for transmitting data, and a title setting screen to be used for setting a title of the data to be stored in a box. Namely, since software keyboards have been provided respectively for these screens, it may be possible to perform similar operations in regard to them.

Second Embodiment

In the first embodiment, the case where the process indicated by the flow chart of FIG. 3 is performed when the buttons provided on the password input screen, the transmission destination setting screen to be used for transmitting the data, or the title setting screen to be used for setting the title of the data to be stored in the box are handled is described by way of example.

As illustrated in FIGS. 2A and 2B, the password input screen itself is not transitioned in response to the handling of the buttons provided thereon. Moreover, on the password input screen, since the result input by the button is converted into the asterisk "*" symbol, it is hard for the user to confirm whether or not the character has been input.

In contrast, on the transmission destination setting screen to be used for transmitting the data or the title setting screen to be used for setting the title of the data to be stored in the box, since it is unnecessary to conceal the character to be input, the input character is not converted into the asterisk "*" symbol. For this reason, it is possible for the user to easily confirm whether or not the character corresponding to the depressed button has been input, by watching the character display section on the screen.

Therefore, in the second embodiment, an example that the button display process is changed according to the kind of screen will be described.

That is, when the password input screen is being displayed, the process same as that of the first embodiment indicated by the flow chart of FIG. 3 is performed by the CPU 102.

On the other hand, when the screen other than the password input screen is being displayed, the displayed color of the button is returned from yellow to original blue by the CPU 102 at the time when the finger of the user is released outside the button area.

As just described, in the second embodiment, the display process of the button is changed according to the kind of screen to be displayed. In other words, the process same as that indicated by the flow chart of FIG. 3 is performed only in regard to the screen such as the password input screen for which it is highly necessary to notify the user that the character has not been input. Thus, by performing the display process indicated by the flow chart of FIG. 3 only on a specific screen such as the password input screen, it is possible for the user to handle and operate the buttons on the screen other than the specific screen with same usability as previously. Here, as the specific screen, for example, a screen on which a character input by a user is not displayed, a screen on which a character input by a user is replaced by another character, or the like is conceivable.

Incidentally, since the display process to be performed on the specific screen in the second embodiment is the same as that in the first embodiment, the detailed description thereof will be omitted.

In the second embodiment, the information processing apparatus 101 has the touch panel 108 thereon. However, the touch panel 108 may be detachably provided on the information processing apparatus 101. Here, the connection between the information processing apparatus 101 and the touch panel 108 may be established either in wireless connection or in wired connection.

Other Embodiments

Incidentally, in the above embodiments, the case where the touch panel 108 is directly depressed by the finger of the user is described by way of example. However, the touch panel may also be depressed by using a specific pointing device such as a pencil-like member or the like.

Further, the touch panel 108 to be used is not limited to the type that the depressed position is specified by detecting the pressure generated because of the depression by the user. That is, a touch panel of a type that a depressed position is specified by detecting static electrical charges generated because of a user's touch may be used.

Incidentally, the present invention may be applied not only to the case where the key on the touch panel 108 is indicated but also to a case where a key of a software keyboard displayed on a PC is indicated (designated) by a mouse or the like. More specifically, when the key displayed on the PC is indicated, the color of an icon or the key is changed from a first color to a second color. Then, when such an indication state is released inside the display area of the key, the process corresponding to the relevant key is performed, and the color of the key is returned from the second color to the first color. On the other hand, when the indication state is released outside the display area of the key, the process corresponding to the relevant key is not performed, and the color of the key is further changed from the second color to a third color different from the first color. By doing so, it is possible for the user to easily confirm whether or not the process corresponding to the key has been performed correctly. Incidentally, as described above, the key to be used in this case may be the icon.

Moreover, in the above embodiments, the case where the color or the shape of the button area 204 is changed when the finger of the user is released from the touch panel is described by way of example. However, the present invention is not limited to this. Namely, it is first discriminated by the CPU 102 whether or not the finger of the user is deviated from the button area 204 while the touch panel is being depressed by this finger. Then, it may be possible to change the color or the shape of the button area 204 when it is discriminated that the finger is deviated from the button area while the touch panel is being depressed. Consequently, it is possible for the user to confirm that the finger is deviated from the button area 204 in the state that the touch panel is still being depressed by this finger, before this finger is released from the touch panel.

Aspects of the present invention can also be realized by a computer of a system or apparatus (or devices such as a CPU or an MPU) that reads out and executes a program recorded on a memory device to perform the functions of the above embodiments, and by a method, the steps of which are performed by a computer of a system or an apparatus by, for example, reading out and executing a program recorded on a memory device to perform the functions of the above embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-065298, filed Mar. 24, 2011, which is hereby incorporated by reference herein in its entirety.

The invention claimed is:

1. An information processing apparatus having a touch panel, the information processing apparatus comprising:
a CPU coupled to a memory and programmed to function as:
an obtaining unit configured to obtain a first position at which an object touched the touch panel, and a second position at which the object separated from the touch panel;
an acceptance control unit configured to control:
to accept an input corresponding to a key when the object is separated from the touch panel, in a case where the first position and the second position are included in an area corresponding to the key, and
not to accept the input corresponding to the key when the object is separated from the touch panel, in a case where the first position is included in the area corresponding to the key and the second position is not included in the area corresponding to the key; and
a display control unit configured to control:
to change a color of the key from a first color to a second color, based on the object touching the touch panel, and to return the color of the key from the second color to the first color, based on the object separating from the touch panel, in the case where the first position and the second position are included in the area corresponding to the key, and
to change the color of the key from the first color to the second color, based on the object touching the touch panel, to keep the color of the key as the second color while the object moves from the first position to the second position, and to change the color of the key from the second color to a third color, based on the object separating from the touch panel, in the case where the first position is included in the area corresponding to the key and the second position is not included in the area corresponding to the key.

2. The information processing apparatus according to claim 1, wherein, in the case where the first position is included in the area corresponding to the key and the second position is not included in the area corresponding to the key, the display control unit is configured to control to return the color of the key from the third color to the first color, when a predetermined time has elapsed after the color of the key is changed from the second color to the third color.

3. The information processing apparatus according to claim 1, wherein the input accepted by the acceptance control unit is a character included in a password.

4. The information processing apparatus according to claim 1, further comprising a transmitter configured to transmit an image, wherein a password is used for transmission of the image by the transmitter.

5. The information processing apparatus according to claim 1, further comprising a printer configured to print an image, wherein a password is used for printing the image by the printer.

6. The information processing apparatus according to claim 1, wherein the object is a finger of a user.

7. A method for controlling an information processing apparatus having a touch panel, the method comprising steps of:
   obtaining a first position at which an object touched the touch panel, and a second position at which the object separated from the touch panel;
   controlling to accept an input corresponding to a key when the object is separated from the touch panel, in a case where the first position and the second position are included in an area corresponding to the key;
   controlling not to accept the input corresponding to the key when the object is separated from the touch panel, in a case where the first position is included in the area corresponding to the key and the second position is not included in the area corresponding to the key;
   controlling to change a color of the key from a first color to a second color, based on the object touching the touch panel, and to return the color of the key from the second color to the first color, based on the object separating from the touch panel, in the case where the first position and the second position are included in the area corresponding to the key; and
   controlling to change the color of the key from the first color to the second color, based on the object touching the touch panel, to keep the color of the key as the second color while the object moves from the first position to the second position, and to change the color of the key from the second color to a third color, based on the object separating from the touch panel, in the case where the first position is included in the area corresponding to the key and the second position is not included in the area corresponding to the key.

8. A non-transitory computer-readable storage medium storing a program that when executed causes a computer to perform a method for controlling an information processing apparatus having a touch panel, the method comprising steps of:
   obtaining a first position at which an object touched the touch panel, and a second position at which the object separated from the touch panel;
   controlling to accept an input corresponding to a key when the object is separated from the touch panel, in a case where the first position and the second position are included in an area corresponding to the key;
   controlling not to accept the input corresponding to the key when the object is separated from the touch panel, in a case where the first position is included in the area corresponding to the key and the second position is not included in the area corresponding to the key;
   controlling to change a color of the key from a first color to a second color, based on the object touching the touch panel, and to return the color of the key from the second color to the first color, based on the object separating from the touch panel, in the case where the first position and the second position are included in the area corresponding to the key; and
   controlling to change the color of the key from the first color to the second color, based on the object touching the touch panel, to keep the color of the key as the second color while the object moves from the first position to the second position, and to change the color of the key from the second color to a third color, based on the object separating from the touch panel, in the case where the first position is included in the area corresponding to the key and the second position is not included in the area corresponding to the key.

* * * * *